(12) United States Patent
Whitfield et al.

(10) Patent No.: US 10,378,363 B2
(45) Date of Patent: Aug. 13, 2019

(54) RESUPPLY HOLE OF COOLING AIR INTO GAS TURBINE BLADE SERPENTINE PASSAGE

(71) Applicant: United Technologies Corporation, Farmington, CT (US)

(72) Inventors: Christopher Whitfield, Manchester, CT (US); Carey Clum, East Hartford, CT (US); Mark Borja, Palm Beach Gardens, FL (US)

(73) Assignee: United Technologies Corporation, Farmington, CT (US)

( * ) Notice: Subject to any disclaimer, the term of this patent is extended or adjusted under 35 U.S.C. 154(b) by 243 days.

(21) Appl. No.: 15/483,003

(22) Filed: Apr. 10, 2017

(65) Prior Publication Data

US 2018/0291748 A1  Oct. 11, 2018

(51) Int. Cl.
*F01D 5/18* (2006.01)
*F02C 7/12* (2006.01)
*F02C 3/04* (2006.01)

(52) U.S. Cl.
CPC ............... *F01D 5/187* (2013.01); *F02C 3/04* (2013.01); *F02C 7/12* (2013.01); *F05D 2220/32* (2013.01); *F05D 2220/3212* (2013.01); *F05D 2230/211* (2013.01); *F05D 2240/301* (2013.01); *F05D 2250/185* (2013.01); *F05D 2260/221* (2013.01); *Y02T 50/676* (2013.01)

(58) Field of Classification Search
CPC ... F01D 5/187; F02C 3/04; F02C 7/12; Y02T 50/676; F05D 2230/221; F05D 2220/3212; F05D 2220/32; F05D 2230/211; F02D 2260/221; F02D 2250/185
USPC .......................................................... 415/115
See application file for complete search history.

(56) References Cited

U.S. PATENT DOCUMENTS

| | | | |
|---|---|---|---|
| 6,227,804 | B1 | 5/2001 | Koga et al. |
| 6,422,817 | B1 | 7/2002 | Jacala |
| 7,520,724 | B2 | 4/2009 | Naik et al. |
| 7,704,046 | B1 | 4/2010 | Liang |
| 8,454,301 | B1 | 6/2013 | Liang |
| 8,864,467 | B1 | 10/2014 | Liang |
| 2012/0230838 | A1 | 9/2012 | Hada |
| 2014/0086756 | A1 | 3/2014 | Papple et al. |
| 2016/0376896 | A1 | 12/2016 | Spangler et al. |

OTHER PUBLICATIONS

European Search Report for European Application No. 18166660.3 dated Aug. 21, 2018.

*Primary Examiner* — Hai H Huynh
(74) *Attorney, Agent, or Firm* — Carlson, Gaskey & Olds, P.C.

(57) ABSTRACT

An airfoil for a gas turbine engine includes pressure and suction side walls joined to one another at leading and trailing edges and extending in a radial direction. A serpentine cooling passage is provided between the pressure and suction side walls. A passageway adjoins a passage wall and is fluidly interconnected to an upstream turn that has radially spaced apart innermost and outermost contours. The innermost contour is provided at the wall. A resupply hole is configured to exit downstream from the innermost contour.

19 Claims, 4 Drawing Sheets

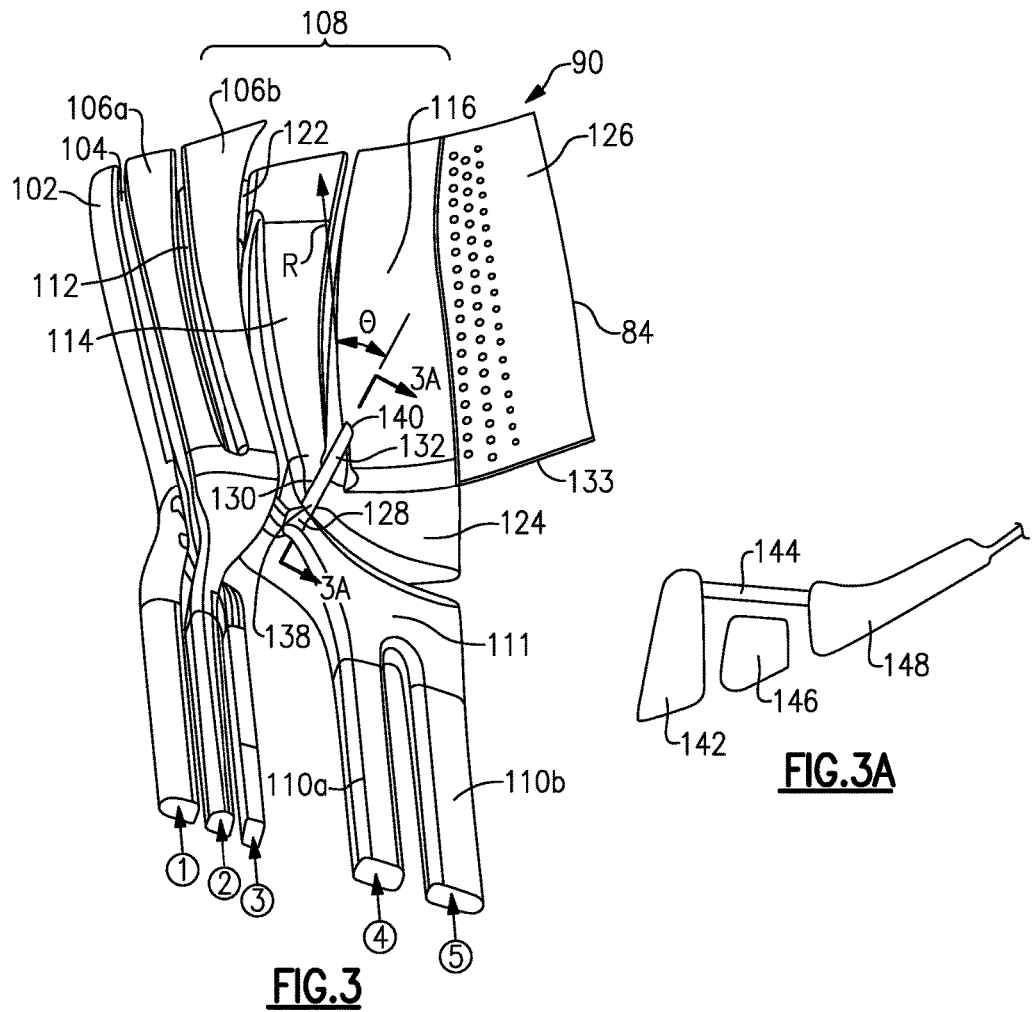
FIG.3
FIG.3A
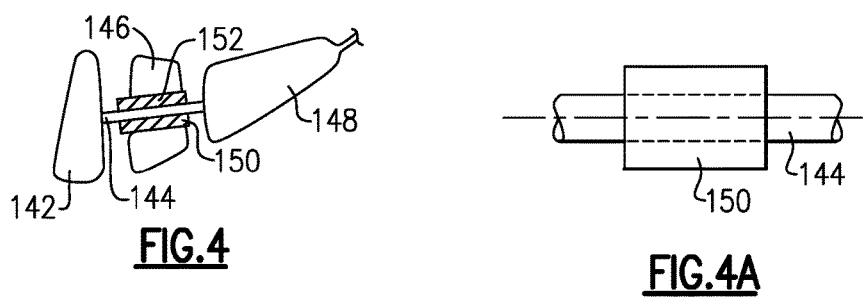
FIG.4
FIG.4A

RESUPPLY HOLE OF COOLING AIR INTO GAS TURBINE BLADE SERPENTINE PASSAGE

STATEMENT REGARDING FEDERALLY SPONSORED RESEARCH OR DEVELOPMENT

This invention was made with government support under contract number DTFAWA-15-A-80010 awarded by the Federal Aviation Administration. The government has certain rights in the invention.

BACKGROUND

This disclosure relates to a gas turbine engine component, such as an airfoil. More particularly, the disclosure relates to a cooling configuration.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Gas path temperatures are well above the melting point of hot section components, necessitating cooling component for adequate durability. Many blades and vanes, blade outer air seals, turbine platforms, and other components include internal cooling passages. Multi-pass serpentine cooling passage configurations, which are a common cooling scheme for gas turbine blades, are susceptible to problems stemming from the cooling air heating up as the cooling flow navigates the internal passages. As the cooling air flows through the airfoil, this air cools the metal surfaces of the blade; however, the cooling airfoil becomes increasingly hot and less effective as the air travels down the passageway.

One approach to provide cooler air further down the passageway of a serpentine cooling passage is to provide a resupply hole parallel to a chord-wise direction of the airfoil and tangent to an outer radius of a turn interconnecting parallel passageways of the serpentine cooling passage.

SUMMARY

In one exemplary embodiment, an airfoil for a gas turbine engine includes pressure and suction side walls joined to one another at leading and trailing edges and extending in a radial direction. A serpentine cooling passage is provided between the pressure and suction side walls. A passageway adjoins a passage wall and is fluidly interconnected to an upstream turn that has radially spaced apart innermost and outermost contours. The innermost contour is provided at the wall. A resupply hole is configured to exit downstream from the innermost contour.

In a further embodiment of any of the above, the serpentine cooling passage includes first, second and third passageways. The first and second passageways are separated by a first wall and fluidly interconnected to one another by a first turn. The second and third passageways are separated by a second wall and fluidly interconnected to one another by a second turn. The passageway corresponds to the third passageway. The passage wall corresponding to the second wall and the turn corresponding to the second turn.

In a further embodiment of any of the above, the first and third passageways are configured to carry a cooling fluid radially outward. The second passageway is configured to carry the cooling fluid radially inward.

In a further embodiment of any of the above, a trailing edge cooling passage is fluidly connected to the third passageway and extends to the trailing edge.

In a further embodiment of any of the above, a root includes an inlet passage. The resupply hole fluidly interconnects the inlet passage to the third passageway.

In a further embodiment of any of the above, the inlet passage is fluidly interconnected to the first passageway.

In a further embodiment of any of the above, the inlet passage includes a boss to which the resupply hole is fluidly connected. The boss is provided on one side of the airfoil with respect to a thickness direction.

In a further embodiment of any of the above, the boss is provided on the pressure side.

In a further embodiment of any of the above, the resupply hole is fluidly connected to the inlet passage centrally with respect to the thickness direction.

In a further embodiment of any of the above, the inlet passage includes first and second inlet passages converging to a junction that is configured to fluidly feed the first passageway. The resupply hole is fluidly connected to the junction.

In a further embodiment of any of the above, the resupply hole is arranged at an angle that is less than 90° with respect to the radial direction.

In a further embodiment of any of the above, the angle is in a range of 15°-75°.

In another exemplary embodiment, a gas turbine engine includes a compressor section. A combustor is fluidly connected to the compressor section. A turbine section is fluidly connected to the combustor. The turbine section includes an array of turbine blades. Each turbine blade includes an airfoil that has pressure and suction side walls joined to one another at leading and trailing edges and extending in a radial direction. A serpentine cooling passage is provided between the pressure and suction side walls. A passageway adjoins a passage wall and is fluidly interconnected to an upstream turn that has radially spaced apart innermost and outermost contours. The innermost contour is provided at the wall. A resupply hole is configured to exit downstream from the innermost contour.

In a further embodiment of any of the above, the serpentine cooling passage includes first, second and third passageways. The first and second passageways are separated by a first wall and fluidly interconnected to one another by a first turn. The second and third passageways are separated by a second wall and fluidly interconnected to one another by a second turn. The passageway corresponds to the third passageway. The passage wall corresponds to the second wall. The turn corresponds to the second turn. The first and third passageways are configured to carry a cooling fluid radially outward. The second passageway is configured to carry the cooling fluid radially inward and comprises a trailing edge cooling passage fluidly connected to the third passageway and extending to the trailing edge.

In a further embodiment of any of the above, a root includes an inlet passage. The resupply hole fluidly interconnects the inlet passage to the third passageway. The inlet passage is fluidly interconnected to the first passageway.

In a further embodiment of any of the above, the inlet passage includes a boss to which the resupply hole is fluidly connected. The boss is provided on one side of the airfoil with respect to a thickness direction. The boss is provided on the pressure side.

In a further embodiment of any of the above, the resupply hole is fluidly connected to the inlet passage centrally with respect to the thickness direction.

In a further embodiment of any of the above, the resupply hole is arranged at an angle that is less than 90° with respect to the radial direction.

In a further embodiment of any of the above, the angle is in a range of 15°-75°.

In a further embodiment of any of the above, the blade is a first stage high pressure turbine blade.

BRIEF DESCRIPTION OF THE DRAWINGS

The disclosure can be further understood by reference to the following detailed description when considered in connection with the accompanying drawings wherein:

FIG. 3 is a perspective view of various cooling passages within an example airfoil.

FIG. 3A is a cross-section taken along line 3A-3A in FIG. 3.

FIG. 4 is a cross-section of an alternative embodiment to that shown in FIG. 3A.

FIG. 4A is an enlarged view of a portion of FIG. 4.

DETAILED DESCRIPTION

Figure 1:
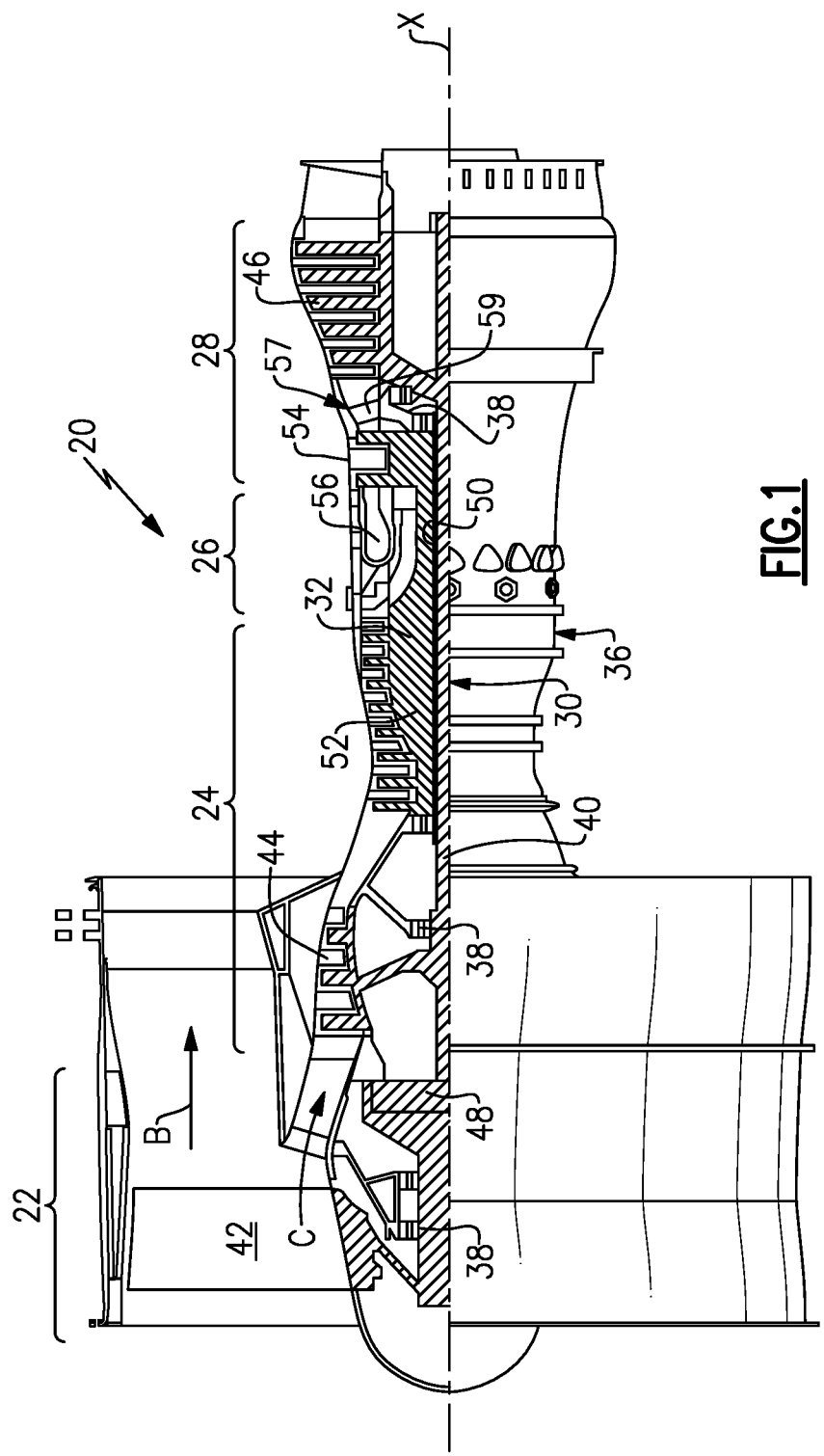
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

Figure 2A:
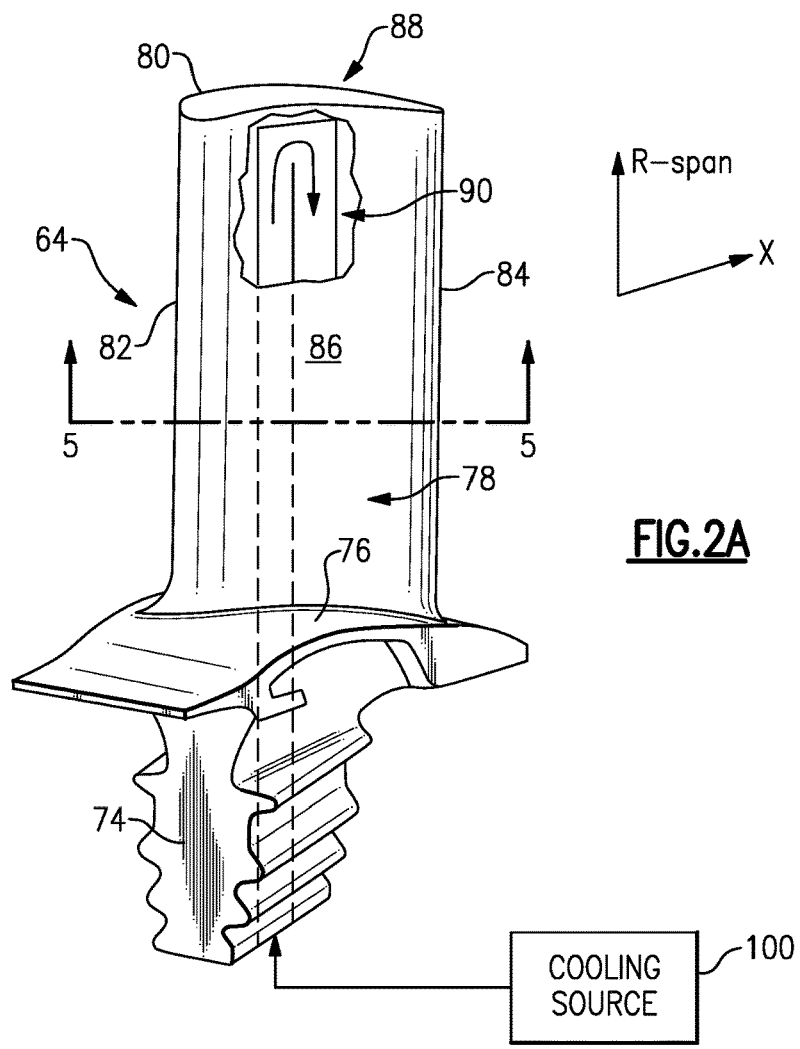
FIG. 2A is a perspective view of the airfoil having the disclosed cooling passage.
Figure 2B:
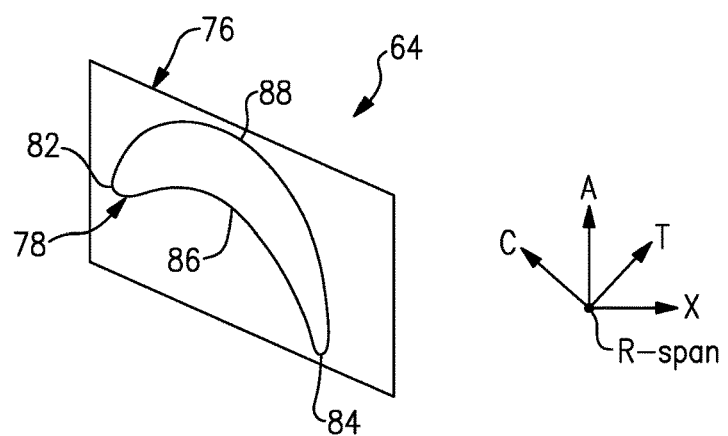
FIG. 2B is a plan view of the airfoil illustrating directional references.

The disclosed cooling passage may be used in various gas turbine engine components. For exemplary purposes, a turbine blade 64 is described, which may be provided in a first stage of the high pressure turbine section 54. Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates an exterior airfoil surface extending in a chord-wise direction C from a leading edge 82 to a trailing edge 84. The airfoil 78 is provided between spaced apart pressure (typically concave) and suction (typically convex) wall 86, 88 in an airfoil thickness direction T, which is generally perpendicular to the chord-wise direction C. The pressure and suction walls 86, 88 are joined at the leading and trailing edges 82, 84. Multiple turbine blades 64 are arranged circumferentially with a stage in a circumferential direction A. The airfoil 78 extends from the platform 76 in the radial direction R, or spanwise, to the tip 80.

The airfoil 78 includes a cooling passage configuration 90 provided between the pressure and suction walls 86, 88. The cooling passage configuration 90, which typically comprises multiple cooling passages, is fed a cooling fluid through the root 74 from a cooling source 100. In one example, the cooling source is provided by a stage of the compressor section 24. The exterior airfoil surface may include multiple film cooling holes (not shown) in fluid communication with the cooling passage configuration 90.

Figure 5:
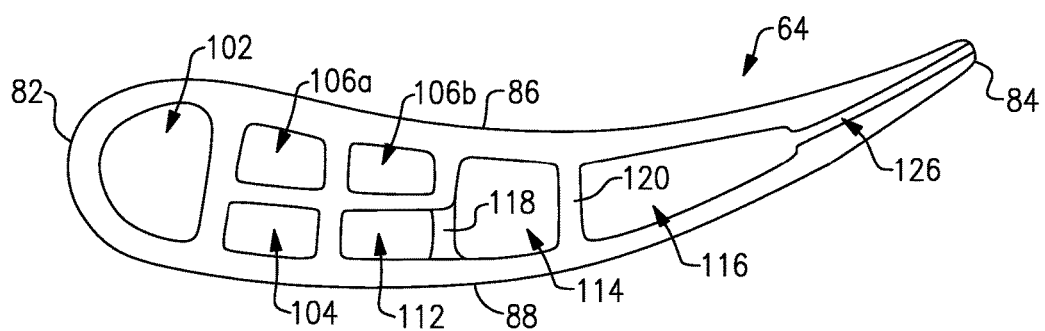
FIG. 5 is a cross-section taken along line 5-5 in FIG. 2A.

Referring to FIGS. 3 and 5, multiple inlet passages (numbered 1-5 in FIG. 3) are provided in the root 74 to feed the various cooling passages within the blade 64. The cooling passage configuration 90 includes a leading edge cooling passage 102 fed by an inlet passage at 1. Another inlet passage is fed at 2 to supply cooling fluid to first and second pressure side cooling passages 106A, 106B. An inlet passage at 3 feeds cooling fluid to a suction side cooling passage 104.

First and second inlet passages 110A, 110B merge into a junction 111 to feed cooling fluid to a serpentine cooling passage 108, which can be any suitable shape such as S-, U- or L-shaped. The serpentine cooling passage 108 includes first, second and third passageways 112, 114, 116. A trailing edge cooling passage 136 fluidly connected to the third passageway 116, which carries the cooling fluid toward and out the trailing edge 84.

The first and second passageways 112, 114 are separated by a passage wall bridging the pressure and suction side walls 86, 88 in the thickness direction T, i.e., first wall 118, that generally extends in the radial direction R. The second and third passageways 114, 116 are separated by a passage wall bridging the pressure and suction side walls 86, 88 in the thickness direction T, i.e., second wall 120, that generally extends in the radial direction R. A first turn 122 fluidly interconnects the first and second passageways 112, 114, and a second turn 124 fluidly interconnects the second and third passageways 114, 116. The first and third passageways 112, 116 carry the cooling fluid in a radial direction toward the tip 80 (an "up-pass"), and the second passageway 114 carries cooling fluid from the first passageway 112 to the third passageway 116 in the radial direction R from the tip 80 toward platform 76 (a "down-pass"). Finally, the third passageway 116 carries the fluid from the second passage 114 toward the tip 80 (an "up-pass") and out the trailing edge cooling passage 126.

As the cooling fluid flows from the inlet passages 110A, 110B toward the third passageway 116, the cooling fluid heats up becoming less effective. The disclosed airfoil includes a resupply hole 132 that is configured to supply fresh cooling air into the final up-pass, which corresponds to the third passageway 116 of the serpentine cooling passage 108. The resupply hole 132 is oriented such that the fresh cooling air is biased or carried toward the tip 80. Typically cooling fluid from prior art configurations is swept out the trailing edge cooling passage before travelling very far toward the tip, minimizing the cooling effectiveness of the fresh cooling air. In the disclosed embodiment, the resupply hole 132 is angled toward the tip 80 and trailing edge 84 at a relatively shallow angle θ with respect to the radial direction R such that the fresh cooling air tends to travel radially outward to provide cooling to the tip of the blade while encouraging the relatively warmer cooling air to exit the serpentine cooling passage 108 at an inboard radial span. In one example, the angle θ is less than 90°, in another example, the angle θ is in a range of 15°-75°.

Referring to FIGS. 3, 3A, 5 and 6, the second turn 124 includes an extrados or outermost contour 134 and an intrados or innermost contour 136. The resupply hole 132 includes an inlet 138 provided at the boss 128 or first passageway 112. An outlet 140 of the resupply hole 132 is arranged downstream from the innermost contour 136. The outlet 140 is positioned at a radially outward location in the radial direction R with respect to a radially inner edge 133 of the trailing edge cooling passage 126. In the example, the resupply hole 132 fluidly interconnects an inlet passage (e.g., 110A/110B) to a location at or downstream from the innermost contour 136, which ensures that the fresh cooling fluid will encourage cool air to flow radially outward without first being swept out the trailing edge cooling passage 126 as occurs in prior art cooling arrangements.

Figure 6:
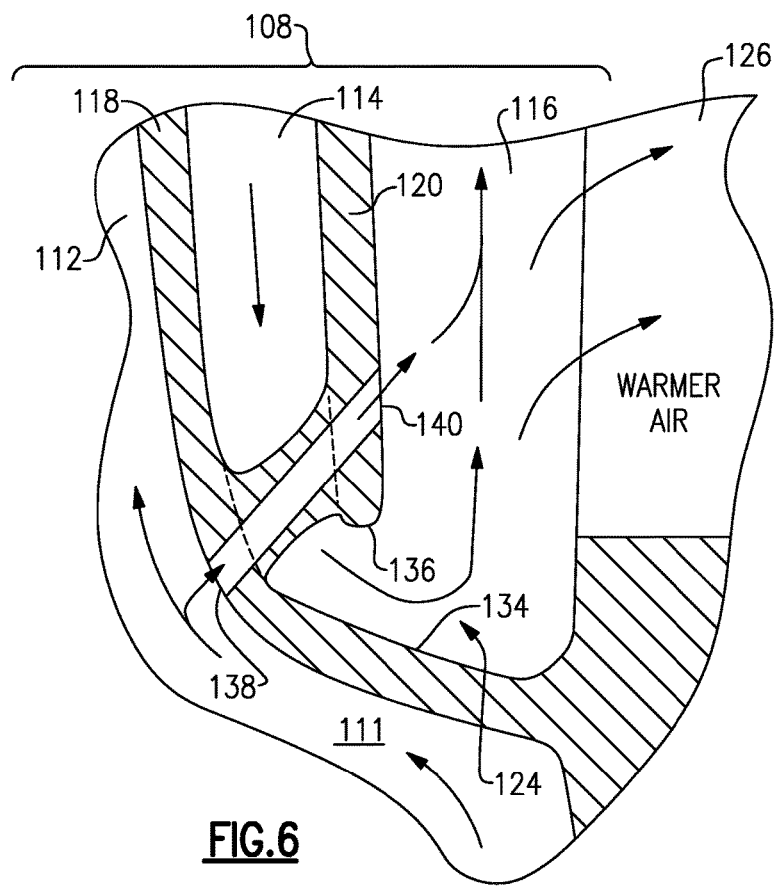
FIG. 6 is an enlarged cross-sectional view of a portion of an airfoil serpentine passage illustrated in FIGS. 3 and 3A.

As best shown in FIGS. 3, 3A and 6, a boss 128 is provided by the junction 111 to provide an inlet 138 to the resupply hole 132 on one side of the airfoil with respect to the thickness direction T, for example the pressure side. In this configuration, a portion of the serpentine cooling passage 108 may include a recess 130, best shown in FIG. 3, to accommodate the resupply hole 132. An arrangement of core portions providing such a configuration is illustrated in FIG. 3A. A resupply hole core 144 interconnects an inlet core 142 to a third passageway core 148. The resupply hole core 144 is arranged to one side of the second passageway core 146.

In another example illustrated in FIGS. 4 and 4A, the resupply core hole 144 may pass through the second passageway core 146 to locate the resupply hole more centrally with respect to the thickness direction T. In one example, the resupply hole core 144 is provided by a quartz rod that is supported with respect to an aperture 152 in the second passageway core 146 by wax 150. This supports the fragile quartz rod during the next step of the airfoil manufacturing process, which typically includes immersing the core assembly in wax within an airfoil mold, as is known in the art.

The tip of rotating gas turbine blades are difficult to cool, particularly in a multi-pass serpentine design. Because the fluid in the serpentine heats up as it continues along the passages, the flow at the end of the final up-pass in these serpentines typically is much less effective at cooling the airfoil than the air at the inlet to the serpentine. Prior art schemes to resupply fresh cooling air to turbine blades introduce the new air at the root of the blade, which it typically gets forced out of the blade at a low radial span of the blade. This may provide a cooling benefit to the lower radial spans of the blade, but very little cooling benefit is provided toward the tip. The disclosed cooling configuration introduces cooling air at a higher radial span in a location where the fresh, cooler flow will tend to provide a cooling benefit toward the outboard radial spans of the airfoil, and very little cooling benefit (if any) toward the root of the blade. Thus, the disclosed cooling configuration locally redistributes additional cooling benefit to the tip of the airfoil, where improved cooling may be more desirable.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
pressure and suction side walls joined to one another at leading and trailing edges and extending in a radial direction, a serpentine cooling passage provided between the pressure and suction side walls, the serpentine cooling passage includes first, second and third passageways, the first and second passageways separated by a first wall and fluidly interconnected to one another by a first turn, the second and third passageways separated by a second wall and fluidly interconnected to one another by a second turn, the first and second walls bridging the pressure and suction side walls in a thickness direction of the airfoil, the second turn has radially spaced apart innermost and outermost contours, the innermost contour provided at the second wall, and a resupply hole fluidly interconnecting the first and third passageways through the first and second walls, the resupply hole configured to exit downstream from the innermost contour.

2. The airfoil of claim 1, wherein the first and third passageways are configured to carry a cooling fluid radially outward, and the second passageway is configured to carry the cooling fluid radially inward.

3. The airfoil of claim 2, comprising a trailing edge cooling passage fluidly connected to the third passageway and extending to the trailing edge.

4. The airfoil of claim 3, comprising a root including an inlet passage, the resupply hole fluidly interconnecting the inlet passage to the third passageway.

5. The airfoil of claim 4, wherein the inlet passage is fluidly interconnected to the first passageway.

6. The airfoil of claim 5, wherein the inlet passage includes a boss to which the resupply hole is fluidly connected, the boss provided on one side of the airfoil with respect to a thickness direction.

7. The airfoil of claim 6, wherein the boss is provided on the pressure side.

8. The airfoil of claim 5, wherein the resupply hole is fluidly connected to the inlet passage centrally with respect to the thickness direction.

9. The airfoil of claim 5, wherein the inlet passage includes first and second inlet passages converging to a junction that is configured to fluidly feed the first passageway, the resupply hole is fluidly connected to the junction.

10. The airfoil of claim 1, wherein the resupply hole is arranged at an angle that is less than 90° with respect to the radial direction.

11. The airfoil of claim 10, wherein the angle is in a range of 15°-75°.

12. A gas turbine engine comprising:
a compressor section;
a combustor fluidly connected to the compressor section;
a turbine section fluidly connected to the combustor, the turbine section includes:
an array of turbine blades, each turbine blade includes an airfoil having pressure and suction side walls joined to one another at leading and trailing edges and extending in a radial direction, a serpentine cooling passage provided between the pressure and suction side walls, the serpentine cooling passage includes first, second and third passageways, the first and second passageways separated by a first wall and fluidly interconnected to one another by a first turn, the second and third passageways separated by a second wall and fluidly interconnected to one another by a second turn, the first and second walls bridging the pressure and suction side walls in a thickness direction of the airfoil, the second turn has radially spaced apart innermost and outermost contours, the innermost contour provided at the second wall, and a resupply hole fluidly interconnecting the first and third passageways through the first and second walls, the resupply hole configured to exit downstream from the innermost contour.

13. The gas turbine engine of claim 12, the first and third passageways are configured to carry a cooling fluid radially outward, and the second passageway is configured to carry the cooling fluid radially inward, comprising a trailing edge cooling passage fluidly connected to the third passageway and extending to the trailing edge.

14. The gas turbine engine of claim 12, comprising a root including an inlet passage, the resupply hole fluidly interconnecting the inlet passage to the third passageway, wherein the inlet passage is fluidly interconnected to the first passageway.

15. The gas turbine engine of claim 14, wherein the inlet passage includes a boss to which the resupply hole is fluidly connected, the boss provided on one side of the airfoil with respect to a thickness direction, wherein the boss is provided on the pressure side.

16. The gas turbine engine of claim 14, wherein the resupply hole is fluidly connected to the inlet passage centrally with respect to the thickness direction.

17. The gas turbine engine of claim 12, wherein the resupply hole is arranged at an angle that is less than 90° with respect to the radial direction.

18. The gas turbine engine of claim 17, wherein the angle is in a range of 15°-75°.

19. The gas turbine engine of claim 12, wherein the blade is a first stage high pressure turbine blade.

* * * * *